United States Patent [19]

Brem

[11] Patent Number: 4,634,909
[45] Date of Patent: Jan. 6, 1987

[54] ELECTRIC MACHINE

[75] Inventor: Ernst Brem, Schlieren, Switzerland

[73] Assignee: BBC Brown, Boveri & Company Limited, Baden, Switzerland

[21] Appl. No.: 753,148

[22] Filed: Jul. 9, 1985

[30] Foreign Application Priority Data

Aug. 8, 1984 [CH] Switzerland ............... 3808/84

[51] Int. Cl.$^4$ .......................................... H02K 5/00
[52] U.S. Cl. ...................................... 310/91; 310/217; 310/258
[58] Field of Search ................. 310/254, 258, 259, 51, 310/216, 217, 218, 91, 42, 43, 45, 58, 89, 59

[56] References Cited

U.S. PATENT DOCUMENTS

| | | | |
|---|---|---|---|
| 1,764,890 | 6/1930 | Reichel | 310/258 |
| 2,199,351 | 4/1940 | Taylor | 310/258 |
| 3,708,707 | 1/1973 | Kranz | 310/258 |
| 3,988,622 | 10/1976 | Starcevic | 310/258 |
| 4,145,626 | 3/1979 | Aroshidze | 310/51 |
| 4,204,313 | 5/1980 | Khutoretsky | 310/42 |

FOREIGN PATENT DOCUMENTS

| | | | |
|---|---|---|---|
| 0314202 | 9/1919 | Fed. Rep. of Germany | 310/258 |
| 0879264 | 4/1953 | Fed. Rep. of Germany | 310/258 |
| 0889794 | 9/1953 | Fed. Rep. of Germany | 310/258 |
| 2042561 | 5/1981 | Fed. Rep. of Germany . | |
| 0029240 | 3/1980 | Japan | 310/258 |
| 0254555 | 7/1926 | United Kingdom | 310/217 |
| 0406267 | 8/1971 | U.S.S.R. | 310/217 |

Primary Examiner—R. Skudy
Attorney, Agent, or Firm—Oblon, Fisher, Spivak, McClelland, & Maier

[57] ABSTRACT

In a large turbo-generator comprising a laminated stack (6) which has on its outside axial grooves (7) which are distributed over the entire circumference and which is there suspended in a housing (1) by wedges extending in its longitudinal direction, the wedges (8) are joined to a wedge carrier (4) which extends parallel to them and is fixed at the housing (1). The wedges are constructed of several parts and have a central center part (8) which is detachably connected to the wedge carrier (4) and which is essentially used for radial support. As support in the circumferential direction, clamping devices, for example in the shape of double inclined wedges (9a, 9b) are provided which are arranged in pairs between the groove side walls and the wedge center part and which are located completely inside the groove (7) and which can be actuated from the front of the completely laminated stator. In this manner, mounting openings in the housing (1) become superfluous and laminating is facilitated.

16 Claims, 6 Drawing Figures

ELECTRIC MACHINE

FIELD OF THE INVENTION

The invention relates to an electric machine comprising a laminated stator which has grooves on its outside which extend axially and which are distributed over the entire circumference of the laminated stator. The laminated stator is suspended in a housing by means of longitudinally extending wedges.

BACKGROUND OF THE INVENTION

The mounting of the stack of stator laminations in the machine housing or in the stator frame, respectively, must be designed in such a manner that it can withstand all radial and tangential forces occurring during operation, and especially in the case of a short circuit, without having to use elaborate machining and/or assembly techniques.

From DE-B2 No. 2,042,561, a turbo-generator having a laminated stack is known in which the laminated stack is suspended on its outside by means of dovetail-shaped wedges extending in its longitudinal direction in a housing, the dovetail-shaped wedges being joined via screw bolts to a wedge carrier which extends parallel to them and is fixed at the housing.

The wedge carriers partially engage recesses at the outside of the stack of stator laminations, resting without play against the recesses, and are designed to be tapered at the part engaging the inside of the stack of stator laminations. In this arrangement, the tapering of the wedge carriers is designed to be arc-shaped. The screw bolts are kept under constant tension by means of spring means supported on the wedge carriers. The wedge carriers are firmly joined to a stator frame arranged inside the housing.

This electric machine is produced in such a manner that first the stack of stator laminations is assembled and pressed together in the axial direction by means of compression plates arranged at its faces, after which the wedges are introduced into grooves provided on the outside of the stack of stator laminations and are clamped, by means of wedge carriers resting against contact faces provided on the outer surface of the stack of stator laminations, by means of the screw bolts. After that the stack of stator laminations clamped in such a manner by the wedges, wedge carriers, and compression plates is introduced into the stator frame and, after being centered with respect to the stator frame, the wedge carriers and the stator frame are firmly joined.

The known construction and arrangement of the wedge carriers ensures that the contact between housing and stack of stator laminations is free from play and is suitable for absorbing forces in the radial and circumferential directions. Simultaneously, the wedges and the screw bolts associated with them are completely relieved of circumferential forces. In addition, they can be retightened at any time.

In DE-B2 No. 2,042,561, the laminated stack is completed in its entirety outside the housing. After the wedges have been introduced and the wedge carriers have been clamped to the stack of stator laminations, the axially clamped stack of stator laminations is introduced into the stator frame and firmly joined to the latter. It is only after this that the stator frame and laminated stack are built into the housing.

In electric machines in which the laminated stack is laminated directly into the housing, the method of proceeding as described above cannot be applied in practice. The frictional connection between the housing and the laminated stack must be made only after the laminated stack has been compressed and consolidated, since otherwise the laminations would no longer be able to shift at the back of the laminated stack. In addition, all mounting points would have to be accessible from the outside over the entire iron length and over the entire circumference, and that in turn would necessitate a very large number of closable openings in the pressure-tight housing jacket.

OBJECT OF THE INVENTION

Starting from the prior art as described above, the invention is based on the object of creating an electric machine of the type initially mentioned, in which the stack of stator laminations can be directly laminated into the machine housing and the frictional connection between the laminated stack and the housing can be established after compressing and consolidating the laminated stack without having to provide mounting openings in the housing jacket.

SUMMARY OF THE INVENTION

The invention provides for a connection of the laminated stack with the housing which is free from play and frictionally connected and which can be accomplished exclusively from the front sides of the housing after the pressing and consolidating process. This is of great advantage, particularly with hydrogen-cooled electric machines where each opening in the housing jacket would have to be sealed to be $H_2$-tight. In the finished mounted and clamped condition, the invention has all positive characteristics of the conventional dovetail wedging (for example according to DE-B2 No. 2,042,561) with respect to the quality of the wedging in the radial and circumferential direction. Depending on the type of the clamping means, it also allows the wedging to be retightened.

The invention is characterised by the following advantages:

Essentially, the laminated stack is radially supported with respect to the housing directly via the centre part of the wedge and that in the circumferential direction via the clamping means. A loosening of the clamping in the circumferential direction thus does not have any direct effect on the quality of the support in the radial direction.

The design of the wedge provides for considerable simplification of the laminating process. As a rule, each layer of lamination consists of several lamination segments which extend in the circumferential direction over two or more wedge carriers. While, in the case of lamination segments having conventional dovetail-shaped recesses and corresponding dovetail-shaped wedges, each individual lamination segment must be pushed from the front over the wedges to the place of installation in the interior of the housing, the lamination segments according to the invention can be lowered to the present position of laminations and there inserted in the radial direction in accordance with the invention.

According to a first embodiment, the clamping means are constructed as double inclined wedges permitting a comparatively simple mechanical clamping, for example by hammer blows. If spring means (preferably constructed as corrugated springs) are arranged between the wedge surfaces, possible settling phenomena can be avoided in operation.

Another construction of the clamping means comprising permanently deformed hollow bodies (for example, thick-walled metal tubes) provides for the simultaneous tightening of all wedges of one groove and, if necessary, even the subsequent retightening of the wedges.

Another alternative construction of the clamping means makes use of a technique which has been successful for years in connection with the wedging of stator windings.

The wedge centre parts may be screwed together with the wedge carriers. Either separate shear bolts or shear bushes, through which the screw bolts are passed, may be used for relieving the screw connection.

The machine housing is normally provided with annular reinforcement ribs which project inwardly and at which the axially extended wedge carriers are mounted, as a rule welded. The wedges are mounted, according to the invention, at the self-supporting section of the wedge carrier between two adjacent reinforcement ribs. This offers the advantage of varying the elasticity of the support between the laminated stack and the housing within certain limits—for example by choice of mounting positions, cross-section, and characterisics of the wedge-carrier material. The wedge carrier then acts as a longitudinal spring.

BRIEF DESCRIPTION OF THE DRAWINGS

In the text which follows, the invention is explained in greater detail with the aid of illustrative embodiments and the drawing, in which.

DETAILED DESCRIPTION OF THE PRESENTLY PREFERRED EMBODIMENTS

Figure 1:
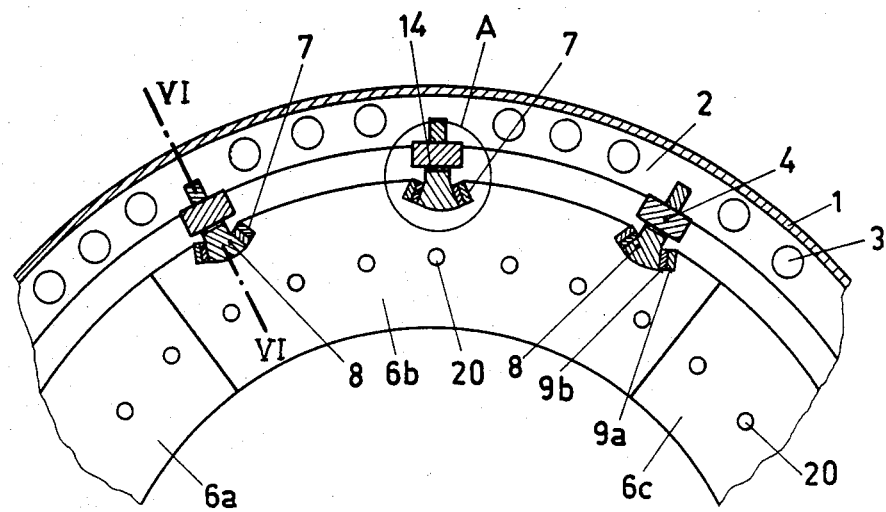
FIG. 1 is a section perpendicular to the axis through the stator of an electric machine.

A stator housing 1 is provided with annular reinforcement ribs 2 which project inwardly and which are provided with perforations 3 for conducting the cooling gas. The reinforcement ribs 2 are welded to wedge carriers 4 each one of which extends over the entire length of iron. U-shaped or flat welding lugs 5 provide for accurate alignment of the wedge carriers 4 in the stator housing 1 (see also FIG. 6). A laminated stack built up of lamination segments 6a, 6b and 6c is designated by the reference number 6. Each lamination segment 6a, 6b, 6c extends in the circumferential direction over three wedge carriers 4 in the case shown. The laminated stack 6 has at its outer circumference uniformly distributed grooves 7. The section, at the back of the laminations, of each groove 7 has a dovetail-shaped profile. Each groove 7 is tapered towards the bottom of the groove. Each wedge is multi-part and consists of a wedge centre part 8 having a neck-shaped cross-section and clamping means, arranged in pairs, in the form of two double-inclined wedges 9 comprising wedge halves 9a and 9b.

The wedge centre part 8 has two triangular grooves which extend symmetrically with respect to its longitudinal axis and the side walls of which are designated by 10, 11 and are perpendicular to each other. Groove 7 has two additional triangular grooves defined by side walls designated as 12 and 12', which are perpendicular to each other. The groove side wall 11 extends plane-parallel to the side wall 12 of the dovetail-shaped section of the groove 7 and forms one contact area of the double inclined wedge 9. The side wall 12 forms the other contact area of the double inclined wedge 9. The other side wall 10 of the triangular groove extends approximately plane-parallel with respect to the inward-tapering section of the groove 7. The hollow rectangular space or duct formed in this manner and extending over the entire axial length of the wedge is virtually completely filled by the double inclined wedge 9.

The wedge centre part 8 is mounted on the wedge carrier 4 by means of a screw bolt 13. Correspondingly thick shims 14 permit the wedges to be accurately aligned with respect to the wedge carrier 4. To absorb forces in the circumferential direction, a shear bush 15 can be provided (see FIG. 6) through which the screw bolt 13 is passed. Naturally, separate shear bolts can also replace the shear bush.

The bottom of the groove 7 can be arc-shaped or level. The lamiated-stack-side end of the wedge centre part 8 has a contour which matches the bottom of the groove 7. The radial flow of force from the laminated stack 6 to the housing 1 essentially occurs via the wedge centre part 8, the shims 14, and the wedge carrier 4 to the reinforcement ribs 2.

Figure 6:
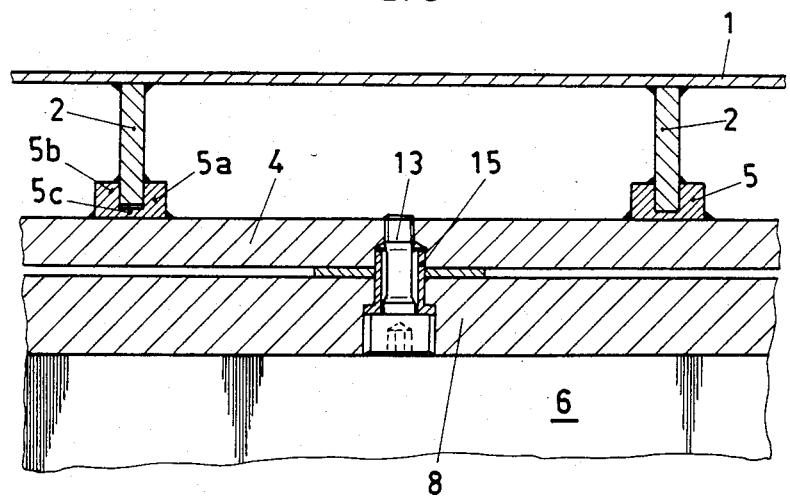
FIG. 6 is a longitudinal section through the stator of FIG. 1 along its line VI—VI.

As can be seen from FIG. 6, the axial length of the support area of the wedge at the wedge carrier 4 is smaller by a multiple than the axial distance between two adjacent reinforcement ribs 2. The radial elasticity of the support of the laminated stack 6 with respect to the housing 1 can be adjusted by choice of the mounting point of the wedge centre part 8 at the wedge carrier 4 and/or by choice of material and cross-section of the wedge carrier 4, since the wedge carrier 4 acts as a longitudinal spring.

FIG. 6 also shows the function of the U-shaped welding lugs 5, each of which has two limbs 5a, 5b and a joining web 5c. The two limbs 5a, 5b enclose the inside end of the reinforcement ribs 2. The joining web 5c can be kept comparatively thin. When the wedge carrier 4 is welded into the (empty) machine housing, the ends of the reinforcement ribs 2 enter more or less deeply into the welding lugs. After alignment of the wedge carriers 4, the welding lugs 5 are welded, on the one hand, to the reinforcement ribs 2 and, on the other hand, to the wedge carriers 4.

Figure 3:
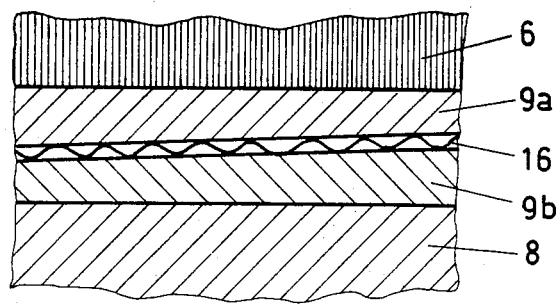
FIG. 3 is a longitudinal section through a double inclined wedge as clamping means.

Together with the wedge centre parts 8, the double inclined wedges 9 support the laminated stack 6 in the circumferential direction. Any settling phenomena occurring after the wedging can be prevented a priori by interposing spring means, for example a corrugated spring 16, between the two wedge halves 9a, 9b (FIG. 3).

Figure 4:
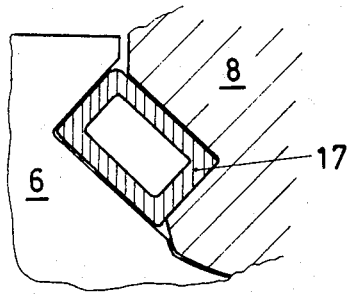
FIG. 4 shows a modification of detail B from FIG. 2 comprising an hydraulically permanently deformable tube.

Instead of double inclined wedges, other clamping means can also be used. Thus, FIG. 4 shows a thick-walled metal tube 17 having a rectangular cross-section, which is inserted into the hollow space between the wedge centre part 8 and the laminated stack 6 and is widened by hydraulic means. In this arrangement, the material of the tube is chosen in such a manner that it plastically deforms when pressure is applied.

Figure 5:
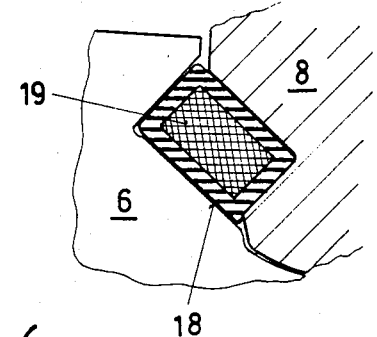
FIG. 5 shows a further modification of detail B from FIG. 2 comprising a synthetic-resin-filled tube as clamping means.

FIG. 5 shows another embodiment of a clamping means. In this case, a deformable tube 18 is inserted into the hollow space between the wedge centre part 8 and the laminated stack 6. The deformable tube 18 is filled with a hardenable synthetic resin 19, the synthetic resin 19 having been cured under pressure.

The stator is assembled in the following steps:

The wedge carriers 4 are welded into the (empty) stator housing 1, using welding gauges.

Figure 2:
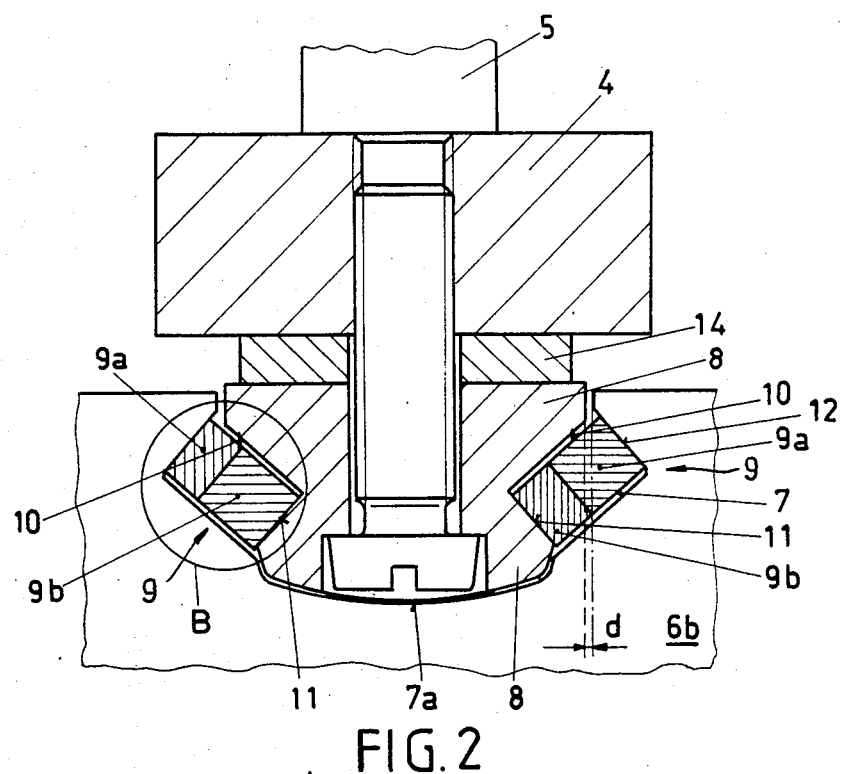
FIG. 2 shows detail A from FIG. 1 at an enlarged scale.

The wedge centre parts 8 are screwed to the positions provided for the purpose, if necessary by interposing the shims 14 and separate shear bolts. Laminations are inserted into the stator housing 7, arranged vertically, in which arrangement the laminations can be essentially radially inserted since the wedge centre parts 8 also become narrower towards the groove bottoms and play d is provided (FIG. 2).

After insertion of the laminations, the laminated stack 6 is clamped in the axial direction with stator compression plates and compression anchors by means of tension bolts 20. This is followed by insertion of the double inclined wedges 9, which are pushed to the intended installed location and wedged to the leading wedge half by hammer blows.

I claim:

1. An electric machine comprising a laminated stack (6) which has on its outside a plurality of grooves (7) which extend axially and are distributed over the entire circumference of said laminated stack (6), said laminated stack (6) being suspended by means of wedges extending in its longitudinal direction in a stator housing (1), in which arrangement said wedges are joined to wedge carriers (4) which extend parallel to said wedges, said wedge carriers (4) being fixed on said stator housing (1), each of said wedges comprising a centre part (8) which is detachably connected to a corresponding one of said wedge carriers (4) and lateral clamping means (9) which can be axially actuated so as to extend completely inside a corresponding one of said grooves (7).

2. An electric machine according to claim 1, wherein:
   (a) said grooves (7) in said laminated stack (6) are dovetail-shaped in the area close to the outer circumference of said laminated stack (6) and taper radially inwardly;
   (b) said centre part (8) of each one of said wedges has as its end facing away from the corresponding one of said wedge carriers (4) contact areas (11) which extend parallel to the walls (12) of the dovetail-shaped section of the corresponding one of said grooves (7) and are spaced from said walls 12;
   (c) said clamping means (9) are arranged in the hollow spaces between said contact areas (11) and said walls 12; and
   (d) said centre part (8) of each one of said wedges is supported by the radially inward part of the corresponding one of said grooves (7).

3. An electric machine according to claim 2, wherein said centre part (8) of each one of said wedges has, seen in the circumferential direction, a total width which is smaller than the width of the corresponding one of said grooves (7) at the outer circumference of said laminated stack (6).

4. An electric machine according to claim 2, wherein said clamping means (9) are constructed as double inclined wedges disposed in said hollow spaces.

5. An electric machine according to claim 4, wherein, between the support areas of said double inclined wedges (9), spring means (16) are arranged.

6. An electric machine according to claim 2, wherein said clamping means (9) are hydraulically permanently deformable hollow bodies.

7. An electric machine according to claim 2, wherein said clamping means (9) are deformable tubes filled with a hardenable synthetic resin and cured under pressure.

8. An electric machine according to claim 1, wherein each one of said wedge centre parts (8) is screwed to the corresponding one of said wedge carriers (4).

9. An electric machine according to claim 1 and further comprising annular reinforcement ribs (2) located inside said stator housing (1), said wedge carriers (4) being welded to said reinforcement ribs (2) and each one of said wedge centre parts (8) being joined to the corresponding one of said wedge carriers (4) between two adjacent reinforcement ribs (2).

10. An electric machine comprising:
   (a) a stator housing that is at least generally cylindrical in shape;
   (b) a plurality of axially spaced reinforcement ribs extending axially inwardly from said stator housing;
   (c) a plurality of lugs welded to each one of said plurality of axially spaced reinforcement ribs;
   (d) a plurality of circumferentially spaced, axially extending wedge carriers welded to corresponding ones of said plurality of lugs;
   (e) a stator that is cylindrical in shape disposed within said radially inwardly spaced from said plurality of circumferentially spaced, axially extending wedge carriers, said stator having a plurality of circumferentially spaced, axially extending grooves in its radially outer surface, each one of said plurality of circumferentially spaced, axially extending grooves being dovetail-shaped in cross-section;
   (f) a plurality of circumferentially spaced, axially extending wedge centre parts, each one of said plurality of circumferentially spaced, axially extending wedge centre parts being disposed in a corresponding one of said plurality of circumferentially spaced, axially extending grooves in the radially outer surface of said stator;
   (g) a plurality of lateral clamping means, one of said plurality of lateral clamping means being located on each side of each one of said plurality of circumferentially spaced, axially extending wedge centre parts between it and a corresponding wall of the corresponding one of said plurality of circumferentially spaced, axially extending grooves in the radially outer surface of said stator, said plurality of lateral clamping means being sized, shaped, and positioned to fix each one of said plurality of circumferentially spaced, axially extending wedge centre parts in the corresponding one of said plurality of circumferentially spaced, axially extending grooves in the radially outer surface of said stator; and
   (h) means for detachably connecting each one of said plurality of circumferentially spaced, axially extending wedge centre parts to a corresponding one of said plurality of circumferentially spaced, axially extending wedge carriers.

11. An electric machine as recited in claim 10 where said means for detachable connecting each one of said plurality of circumferentially spaced, axially extending wedge centre parts to a corresponding one of said plurality of circumferentially spaced, axially extending wedge carriers comprise a plurality of screw bolts.

12. An electric machine as recited in claim 10 and further comprising a shim located between at least some of said plurality of circumferentially spaced, axially extending wedge centre parts and the corresponding ones of said plurality of circumferentially spaced, axially extending wedge carriers.

13. An electric machine as recited in claim 10 wherein each one of said plurality of laterally clamping means comprises a double inclined wedge.

14. An electric machine as recited in claim 10 wherein each one of said plurality of lateral clamping means comprises a fluidically permanently deformable hollow body.

15. An electric machine as recited in claim 10 wherein each one of said plurality of laterally clamping means comprises a deformable tube filled with a hardenable synthetic resin.

16. An electric machine comprising:
  (a) a laminated core;
  (b) a housing surrounding said laminated core, said housing being provided with a plurality of radially extending reinforcing ribs on which said laminated core is fastened;
  (c) said laminated core having on its outer periphery grooves which run in the longitudinal direction of said laminated core;
  (d) a wedge being disposed in each one of said grooves;
  (e) said wedges being fastened to said reinforcing ribs;
  (f) the width of said wedges in the peripheral direction being dimensioned so that said wedges can be submerged in said grooves in said laminated core;
  (g) said grooves in said laminated core broadening from the groove openings to the groove bottoms;
  (h) triangular side grooves being provided in the opposite side surfaces of said wedges;
  (i) said grooves in said laminated core being provided with lateral additional grooves;
  (j) each one of said lateral additional grooves also exhibiting a triangular shape in cross section;
  (k) said lateral additional grooves in said laminated core and said side grooves in said wedges being designed so that an approximately rectangular space occurs on both sides of each one of said wedges, said approximately rectangular space extending the entire length of said laminated core; and
  (l) in said approximately rectangular spaces are disposed lateral clamping means which can be expanded circumferentially in order to fix said wedges in said grooves.

* * * * *